United States Patent [19]

Hofer et al.

[11] 4,206,076

[45] Jun. 3, 1980

[54] N-(PARA-HYDROXYBIPHENYL)AMIDES

[75] Inventors: Kurt Hofer, Münchenstein; Rudolf Moesch, Stein; Guenther Tscheulin, Frick, all of Switzerland; Anton Voykowitsch, Enzerfdorf-Südstadt, Austria

[73] Assignee: Sandoz Ltd., Basel, Switzerland

[21] Appl. No.: 855,233

[22] Filed: Nov. 28, 1977

Related U.S. Application Data

[60] Division of Ser. No. 612,812, Sep. 12, 1975, Pat. No. 4,067,895, which is a continuation-in-part of Ser. No. 418,709, Nov. 23, 1973, abandoned, which is a continuation-in-part of Ser. No. 354,238, Apr. 25, 1973, abandoned.

[30] Foreign Application Priority Data

Apr. 28, 1972 [CH] Switzerland .................... 6443/72

[51] Int. Cl.$^2$ .................... C08K 5/34; C07D 209/34; C07D 207/12
[52] U.S. Cl. .................... 252/400 R; 260/45.8 RB; 260/325 PH; 260/439 R; 260/45.75 C; 260/45.9 NC; 260/45.75 W; 260/45.75 N; 260/404; 260/326 A; 260/326 R; 260/326 S; 260/326 HL; 260/429 R; 260/429.9; 260/438.1; 260/561 S; 260/558 P; 260/562 P; 260/559 S; 260/559 R; 260/559 D; 260/562 S

[58] Field of Search ........ 260/326 A, 326 S, 239.3 R, 260/326.5 S, 326.5 FM, 571, 45.8 NB, 45.9 QA, 45.75 C, 45.75 W, 45.75 N, 429 R, 438.1, 326 R, 439 R, 326 HL, 325 PH; 252/400 R

[56] References Cited

U.S. PATENT DOCUMENTS

| | | | |
|---|---|---|---|
| 2,355,593 | 8/1944 | Kosolapoff | 260/571 |
| 3,000,900 | 9/1961 | Tawney | 260/326.5 FM |
| 3,148,196 | 9/1964 | Ladd | 260/326.5 FM |
| 3,444,536 | 7/1948 | Searle | 260/326.5 FM |
| 3,491,057 | 1/1970 | Kato et al. | 260/45.8 NB |
| 3,637,809 | 1/1972 | Kleiner | 260/45.85 S |
| 3,746,721 | 7/1973 | Stephen | 260/45.8 NB |
| 3,763,093 | 10/1973 | Klectecka et al. | 260/45.8 NB |
| 3,896,146 | 7/1975 | Stephen | 260/45.8 NB |
| 3,956,293 | 5/1976 | Lind | 260/326 A |

OTHER PUBLICATIONS

Soviet Inventions Illustrated, Jan. 1967, p. 5:19.

*Primary Examiner*—V. P. Hoke
*Attorney, Agent, or Firm*—Gerald D. Sharkin; Richard E. Vila; Thomas C. Doyle

[57] ABSTRACT

Novel compounds based on a hydroxybiphenyl nucleus in which the hydroxy group is in the para position relative to the other phenyl ring and has an adjacent tertiary alkyl radical, are useful stabilizers for organic compounds against heat, light or oxygen.

11 Claims, No Drawings

N-(PARA-HYDROXYBIPHENYL)AMIDES

This is a division of application Ser. No. 612,812 filed Sept. 12, 1975, now U.S. Pat. No. 4,067,895, which in turn is a continuation-in-part of U.S. Ser. No. 418,709, filed Nov. 23, 1973, now abondoned, which in turn is a continuation-in-part of U.S. Ser. No. 354,238, filed Apr. 25, 1973, also abandoned.

This invention relates to hydroxybiphenyl derivatives.

The invention provides compounds of formula I,

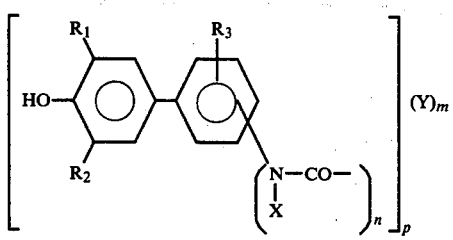

in which $R_1$ signifies a tertiary alkyl radical of 4 to 9 carbon atoms, $R_2$ signifies an alkyl, cycloalkyl or cycloalkylalkyl radical of up to 18 carbon atoms or an aralkyl radical of up to 18 carbon atoms, $R_3$ signifies hydrogen, an alkyl, cycloalkyl or cycloalkylalkyl radical of up to 9 carbon atoms, halogen, cyano, trifluoromethyl or a radical of formula

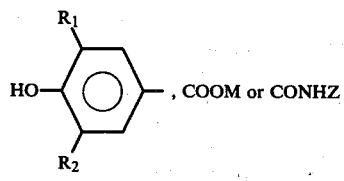

in which $R_1$ and $R_2$ are as defined above,

M signifies hydrogen, nickel, zinc, manganese, copper or an alkyl radical of 1 to 9 carbon atoms, and Z signifies an alkyl radical of 1 to 9 carbon atoms, X signifies hydrogen or —CO— which together with the other —CO— group bound to the nitrogen atom is bound directly to Y to form a five or six membered ring, each Y signifies a mono-,di-,tri-or tetravalent aliphatic, alicyclic, alicyclicaliphatic or araliphatic radical which is saturated or unsaturated with one or two double or triple bonds with a total of up to 22 carbon atoms or an aromatic radical with a total of up to 22 carbon atoms, which radicals are bound directly or through —COO— or —CONH— to the radical in square brackets, have no hetero atoms or are interrupted up to four times by sulphur or oxygen atoms or by —COO— or —CONH— and are unsubstituted or substituted by halogen, OH, CN or COOM', in which M' signifies hydrogen, nickel, zinc, manganese or copper, n signifies 1 or 2, m signifies 1 or 2, p signifies 1, 2, 3 or 4, and when n is 1 and p is 2, Y may also signify a direct linkage.

The invention also provides a process for the production of compounds of formula I which comprises forming an amide linkage in conventional manner between a compound comprising a radical of formula IIa

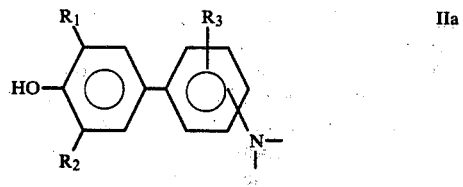

in which $R_1$ to $R_3$ are as defined above, and a compound comprising a radical of formula Y in which Y is as defined above, to form a compound of formula I as defined above.

Thus one embodiment of the process comprises a process for the production of compounds of formula I, which comprises reacting a compound of formula II,

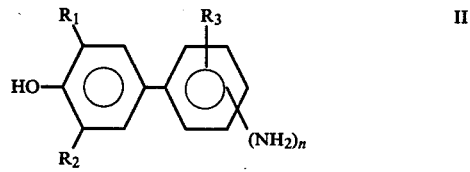

in which $R_1$ to $R_3$ and n are as defined above, with a compound of formula III,

$$Y(COOH)p \quad\quad III$$

in which p is as defined above and Y is as defined above and is bound directly or through the —OOC— or —NHCO— group to the carboxyl group, or a functional derivative thereof.

The process of the present invention, i.e. the reaction of the starting materials of formulae II and III, is an acylation process and can be carried out in analogy to known methods. If the carboxylic acid of formula III is one of sufficiently low volatility, for instance stearic, adipic or terephthalic acid, the two starting compounds can be reacted with heating, which leads to dehydration and formation of the final product. The reaction can also be carried out in the melt at about 120° to 220° C. under normal or reduced pressure, or in the presence of an inert solvent such as xylene which is preferably distilled slowly during the reaction and thus acts as an entrainer for removal of the water split off in the reaction. A catalyst such as boric acid can be added to accelerate the reaction. The reaction of the amine with the carboxylic acid can be carried out under milder conditions with the aid of one of the reagents used in peptide chemistry, for example bis-cyclohexyl carbodiimide.

The anhydrides are suitable functional derivatives of carboxylic acids of formula III, for example succinic anhydride, phthalic anhydride, homophthalic anhydride, diglycolic and thiodiglycolic anhydride.

The acylation reaction can also be carried out using the chlorides of acids of formula III, preferably in the presence of acid-binding agents. If starting compounds of formula III in which p is greater than 1 are used, either only one of the carboxyl groups in the polycarboxylic acid can be employed for acylation, leaving the other carboxyl groups free to appear in the final product of formula I as substituents in the radical Y, or the reaction conditions and the ratio of the starting products can be chosen so that all the carboxyl groups in the compound of formula III take part in the acylation reaction so that none are present in the radical Y of the final product of formula I.

To obtain final products of formula I in which X signifies the CO radical which with Y is bound to form a five- or six-membered ring, corresponding polycarboxylic acids or functional derivatives of these should be employed. All the polycarboxylic acids which are capable of forming five- or six-membered cyclic imides are suitable, examples being maleic anhydride, succinic acid, glutaric anhydride, phthalic anhydride, homophthalic acid, tricarbalylic acid, benzene-1,2,3- and benzene-1,2,4-tricarboxylic acid and pyromellitic acid.

The compounds in which Y is bound through the intermediate radical —CONH— to the radical in square brackets, can also be obtained by reacting a compound of formula II with oxalic acid or a functional derivative of this acid, and reacting the resulting product with an amine of formula IV, $$Y(NH_2)_p \qquad IV$$

in which

Y and p are as defined above.

Thus, a compound of formula II can be reacted with an ester of oxalic acid, in the ratio of one amine group of the former compound to one mol of the ester. Reactions such as this run smoothly with heating of the mixture of reactants and take place with cleavage of one mol of alcohol from one mol of the oxalic ester. Oxalic esters of lower molecular weight such as oxalic diethylester and oxalic dimethylester are particularly suitable for this reaction. By reacting these amide esters of oxalic acid with organic amines, substituted diamides of oxalic acid, i.e. compounds of formula I, can be obtained, in which Y is bound through the intermediate member —CO—NH— to the radical in square brackets:

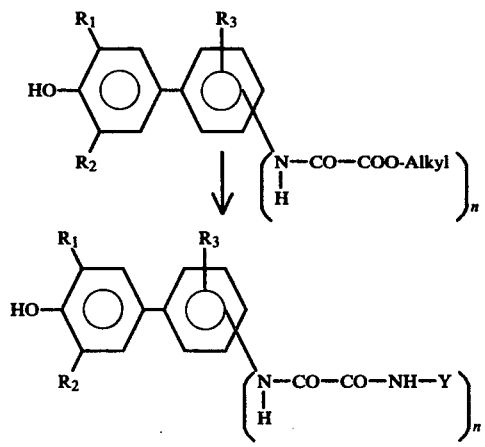

Compounds of formula I in which the radical Y is bound through intermediate oxalic radical —CONH— or —COO— can be produced, in accordance with the invention, by reaction of an oxalic acid derivate of formula VI, alkyl—OOC—CO—V—Y  VI in which Y is as defined above, V signifies —O— or —NH—, and alkyl signifies a lower alkyl radical preferably of 1 to 4 carbon atoms, with a compound of formula II. This analogy reaction can be effected by mixing the two reactants and heating the mixture until splitting off of alcohol is complete. One mol of a compound of formula VI reacts per amino group of the compound of formula II.

As stated above, Y in the compounds of formulae I and III may also signify a direct linkage, provided that n signifies 1 and p signifies 2. The compounds thereby defined are symmetrical oxamides of formula Ie,

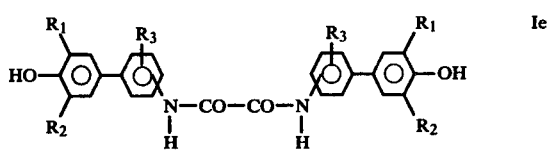

in which $R_1$ to $R_3$ are as defined above.

These oxamides are readily obtainable by reaction of one mol oxalic acid or a functional derivative thereof, such as oxalyl chloride or a lower ester, with two mols of an amine of formula II in which n signifies 1. This method runs smoothly and is analogous to methods known in the art.

The radical $R_3$ may signify the carboxyl group, and in addition the radical Y may be substituted by carboxyl groups. These carboxyl groups may be present in the free form or in the form of nickel, zinc, manganese or copper salts. These salts are easily formed by conventional methods. The preferred method is to dissolve a soluble salt of the carboxylic acid, in particular an alkali salt, in water or an organic solvent and to react with a soluble salt of nickel, zinc, manganese or copper; the double reaction gives rise to the formation of the desired heavy metal salt of formula I which is normally poorly soluble and can be easily isolated in the pure form by filtration and washing.

The radical $R_1$ may have, for example, any of the following significations: tertiary butyl, 2-methyl-2-butyl, 2,3-dimethyl-2-butyl, 2-methyl-2-pentyl, 3-methyl-3-pentyl, 3-ethyl-3-pentyl, 2,4-dimethyl-2-pentyl, 2-methyl-2-hexyl, 3-methyl-3-hexyl, 3,4-dimethyl-3-hexyl, 3,5-dimethyl-3-hexyl, 2-methyl-2-heptyl, 3-methyl-3-heptyl, 4-methyl-4-heptyl, 2,3,4-trimethyl-3-pentyl, 2,4,4-trimethyl-2-pentyl, 3-ethyl-3-heptyl, 2-methyl-2-octyl, 4-methyl-4-octyl. $R_1$ may be of cyclic structure, for example 1-methyl-cyclopentyl, 1-methyl-cyclohexyl, 1-methyl-cycloheptyl, 1-propyl-cyclopentyl and 1-butyl-cyclopentyl. Preferably $R_1$ has 4 to 6 carbon atoms and in particular it signifies tertiary butyl.

The alkyl radical $R_2$ may be primary, secondary or tertiary, linear or branched. Examples of suitable radicals $R_2$ are methyl, ethyl, propyl, butyl, pehtyl, hexyl, and unbranched alkyl radicals with 7 to 18 carbon atoms. Examples of secondary alkyl radicals are isopropyl, 2-butyl, 3-methyl-2-butyl, 2-pentyl, 2,2-dimethyl-3-butyl, 2-hexyl, 3-hexyl, 2-methyl-3-pentyl, 3-methyl-2-pentyl, 4-methyl-2-pentyl, 2,2-dimethyl-3-pentyl, 2,4-dimethyl-3-pentyl, 2-heptyl, 3-heptyl, 4-heptyl, 2-methyl-3-hexyl, 4-methyl-3-hexyl, 5-methyl-3-hexyl, 3-ethyl-4-hexyl, 2,2-dimethyl-3-hexyl, 2,4-dimethyl-3-hexyl, 2,5-dimethyl-3-hexyl, 3,4-dimethyl-2-hexyl, 2-methyl-3- heptyl, 3-methyl-2-heptyl, 3-methyl-4-heptyl, 4-methyl-3-heptyl, 5-methyl-3-heptyl, 6-methyl-2-heptyl, 2-octyl, 3-octyl, 4-octyl, 2,2,4-trimethyl-3-pentyl, 5-ethyl-2-heptyl, 2,2-dimethyl-3-heptyl, 2,6-dimethyl-4-heptyl, 2-methyl-3-octyl, 3-methyl-4-octyl, 6-ethyl-3-octyl, 2-decyl, 5-decyl, 2,2-dimethyl-3-octyl, 2-methyl-4-nonyl, 3-methyl-4-nonyl, 6-ethyl-3-decyl, 7-ethyl-2-methyl-4-nonyl, 2-dodecyl, 2,6,8-trimethyl-4-nonyl, 2-tridecyl, 2-tetradecyl, 2-pentadecyl, 2-hexadecyl. If R₂ has the significance of a cycloalkyl radical it may be, for example, cyclopentyl, cyclohexyl, cycloheptyl, 2-, 3- or 4-methyl-cyclohexyl, cyclooctyl, 2,5-, 2,6-, 3,4- or 3,5-dimethyl-cyclohexyl, 1-cyclohexyl-propyl, 2-propyl-cyclohexyl, 3,3,5-trimethyl-cyclohexyl, 2-butyl-cyclohexyl, 4-tert. butyl-cyclohexyl, 3-methyl-6-isopropyl-cyclohexyl or cyclododecyl. If R₂ has the significance of a cycloalkylalkyl radical it may be, for example, cyclohexyl-methyl, 2-cyclohexylethyl, cycloheptyl-methyl, 3-cyclohexyl-propyl, cyclooctyl-methyl, cycloundecyl-methyl or cyclododecyl-methyl.

Further, R₂ may signify a tertiary radical like R₁ or a branched radical, for example 2-methyl-1-propyl, 2,2-dimethyl-1-propyl, 2-methyl-1-butyl, 2-ethyl-1-butyl, 2,2-dimethyl-1-butyl, 2-methyl-1-pentyl, 3-methyl-1-pentyl, 4-methyl-1-pentyl, 2,4-dimethyl-1-pentyl, 2-ethyl-1-hexyl, 2,2-dimethyl-1-hexyl, 2,2,4-trimethyl-1-pentyl, 4-methyl-2-propyl-1-pentyl, 3,7-dimethyl-1-octyl, 2,2-dimethyl-1-decyl. If R₂ signifies an aralkyl radical, this is preferably benzyl or phenylethyl. Preferably R₂ is one of the named radicals with 4 to 9 carbon atoms, preferably identical with R₁, in particular tertiary butyl.

When R₃ is an alkyl, cycloalkylalkyl radical, it may be primary, secondary or tertiary, linear or branched.

Examples of such radicals with 1 to 9 carbon atoms are named above for R₁ and R₂. Further, R₃ may signify hydrogen, halogen such as bromine or in particular chlorine, CN, CF₃ or —COOM or —CONHZ, in which the alkyl radical Z may stand for one of the alkyl radicals with 1 to 9 carbon atoms named for R₁ and R₂. The preferred significance of Z is methyl or ethyl. The preferred significance of R₃ is hydrogen.

Preferred radicals for Y are, for example, monovalent radicals such as:

| | |
|---|---|
| —CH₃ | —CH₂—CH₂—COOH |
| tert.-C₄H₉ | |
| i-C₈H₇ | |
| n-C₉H₁₉ | —CH₂—CH₂—COO$\underline{Ni}\over 2$ |
| n-C₁₁H₂₃ | |
| n-C₁₂H₂₅ | —CH₂—CH₂—COO$\underline{Zn}\over 2$ |
| n-C₁₃H₂₇ | —CH═CH—CH═CH—CH₃ |
| n-C₁₇H₃₅ | —CH₂—CH₂—C(CH₃) (C₆H₄OH)₂ |
| n-C₁₈H₃₇ | |
| n-C₂₁H₄₃ | |
| —CH₂Cl | |
| —CH₂CH₂Cl | |
| —CH₂—S—C₁₂H₂₅(n) | |
| —CH₂—CH₂—S—C₁₂H₂₅(n) | |
| —CH₂—CH₂—COOCH₃ | |

The following also are suitable:

C₂H₅

Further suitable radicals include, for example:

The radical Y may be substituted by halogen, preferably chlorine. Further suitable substituents are the nitrile and hydroxyl groups. The hydroxyl group is preferably phenolic (bound to a benzene ring) and sterically hindered by at least one tertiary alkyl group in an ortho position thereto.

The amino groups in the compound of formula II are preferably in the ortho- or para-position with respect to the direct linkage connecting the two benzene rings. Compounds of formula II are preferred in which only one amino group occurs, i.e. in which n signifies 1.

Examples of starting compounds of formula II in which

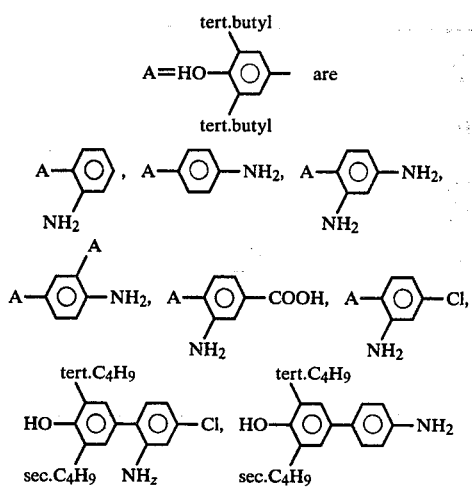

The compounds of formula III are mono- or polycarboxylic acids of their functional derivatives. Examples of mono-carboxylic acids are acetic, propionic, butyric, valeric, caproic and caprylic acid, and linear high molecular weight mono-carboxylic acids with up to 20 carbon atoms, for example stearic and arachic acid. The monocarboxylic acids may have a branched carbon base structure; examples of these are isobutyric, isovaleric, 2-methylbutyric, pivalic, 2-ethylbutyric, 3,3-dimethylbutyric, isocaproic, 2-methyl-n-valeric 2,2-dimethyl-n-valeric, 2-ethylcaproic, 2-ethyl-2-methyl-, caproic, 2,2-dimethylcaprylic and 2,2-dimethylundecanoic acid.

The suitable mono-carboxylic acids include those which in place of aliphatic aromatic radicals, or long with such radicals, contain aromatic and aliphatic radicals. Examples of these acids are benzoic ortho, meta- and para-toluylic, 2,3-, 2,4-, 2,5-, 3,4- and 3,5-dimethylbenzoic, 1- and 2-naphthoic, biphenyl-2-carboxylic, biphenyl-4-carboxylic, phenylacetic, hydrocinnamic, 2-, 3- and 4-phenylbutyric acid. Examples of mono-carboxylic acids of formula III in which the hydrocarbon radical Y is interrupted by oxygen or sulphur atoms are methoxyacetic, butoxyacetic, 2-methoxybenzoic, 4-ethoxybenzoic, 2,3-, 2,4-, 2,6- and 3,5-dimethoxybenzoic, 2-methoxyphenoxyacetic, 2-phenoxybenzoic, methoxyethoxyacetic, 4-ethoxyethoxybenzoic, dodecylthioacetic, 2-(octadecylmercapto)propionic, phenylmercapto-acetic and methylmercaptoethoxyacetic acid.

The monocarboxylic acids used as starting compounds may contain in the hydrocarbon radical the bridge members —COO— or —CO—NH—. Examples of such acids are adipic mono-methylester, terephthalic mono-octylester, the maleic mono-ester of 2,6-dichlorophenol, the mono-anilide of diglycolic acid, the monobutylamide of thiodiglycolic acid, and the carboxylic acid of formula

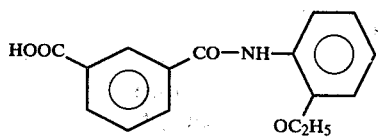

The compounds of formula III may contain several carboxyl groups. Examples are maleic, adipic, glutaric, methylsuccinic, 2-methylglutaric, 3-methylglutaric, meso-2,3-dimethylsuccinic, 2-ethyl-2-methylsuccinic, 2,2-dimethylglutaric, 2,4-dimethylglutaric (symmetrical), 3,3-dimethylglutaric, pimelic, 3-ethyl-3-methylglutaric, 2,5-dimethyladipic, suberic, azelaic, dipropylmalonic, 3-tert.butyladipic, sorbic, cis-4-cyclohexane-1,2-dicarboxylic, cyclohexane-1,1-diacetic, sebacic, undecanoic, dodecanoic, diglycolic, thiodiglycolic, phthalic, isophthalic, terephthalic, homophthalic, tetrachlorophthalic, 1,8-naphthalenedicarboxylic, phenylsuccinic, diphenyl-2,2-dicarboxylic, benzene-1,2,3-, 1,2,4- and 1,3,5-tricarboxylic, 1,2,3-propane-tricarboxylic, 1,3,5-pentane-tricarboxylic, pyromellitic and naphthalene-1,4,5,8-tetracarboxylic acid.

Compounds of the general formula I which are worth of special note are compounds of formula Ia,

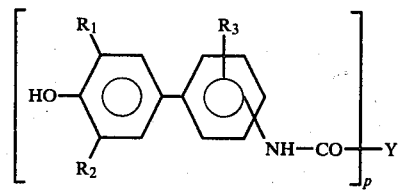

in which p, $R_1$, $R_2$, $R_3$ and Y are as defined above.

The nitrogen atom bound to the benzene ring occupies preferably the ortho or para position to the diphenyl bond.

Further noteworthy compounds agreeing with the general formula I have the formula Ib,

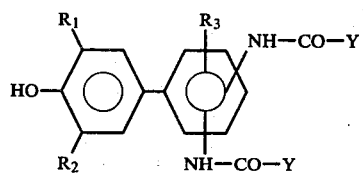

in which $R_1$, $R_2$, $R_3$ and Y are as defined above and Y signifies a monovalent radical.

The compounds of formula I also comprise compounds of formula Ic,

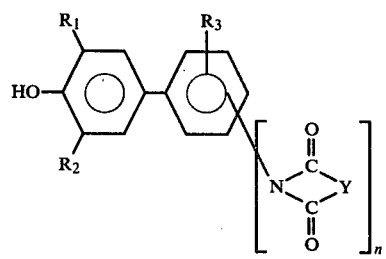

in which $R_1$, $R_2$, $R_3$, n and Y are as defined above, and Y signifies a divalent radical.

The compounds of formula I also comprise compounds of formula Id,

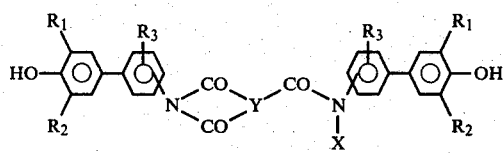

in which $R_1$, $R_2$, $R_3$, X and Y are as defined above, and Y signifies a trivalent or tetravalent radical.

The compounds of formula I also comprise compounds of formula Ie,

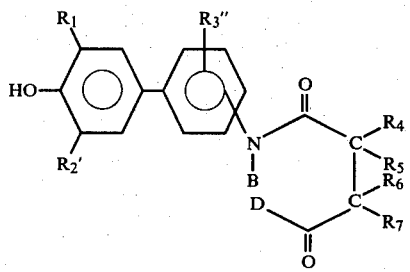

in which $R_1$ signifies a tertiary alkyl radical of 4 to 9 carbon atoms, $R_2'$ signifies an alkyl radical of 1 to 18 carbon atoms or a cycloalkyl, cycloalkylalkyl or aralkyl radical of up to 15 carbon atoms, $R_3''$ signifies hydrogen, an alkyl, cycloalkyl or cycloalkylalkyl radical of up to 9 carbon atoms, halogen, or a radical of formula

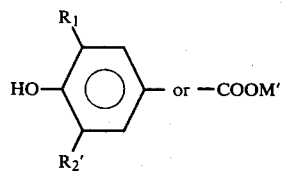

wherein $R_1$ and $R_2'$ are as defined above,
and

M' signifies hydrogen or an alkyl radical of 1 to 9 carbon atoms,
each of $R_4$ and $R_6$, independently, signifies hydrogen or methyl,
each of $R_5$ and $R_7$, independently, signifies hydrogen, methyl or a radical of formula

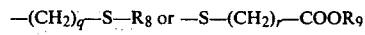

$-(CH_2)_q-S-R_8$ or $-S-(CH_2)_r-COOR_9$ wherein $R_8$ signifies an alkyl radical of 1 to 18 carbon atoms, a cycloalkyl, cycloalkylalkyl or aralkyl radical of up to 12 carbon atoms, the aryl nucleus of the aralkyl radical being unsubstituted or substituted by halogen or an alkyl radical of 1 to 9 carbon atoms, or a phenyl radical, unsubstituted or substituted by halogen or an alkyl radical of 1 to 9 carbon atoms, $R_9$ signifies hydrogen, an alkyl radical of 1 to 12 carbon atoms, a cycloalkyl, cycloalkylalkyl or aralkyl radical of up to 8 carbon atoms, or a phenyl radical, unsubstituted or substituted by halogen or an alkyl radical of 1 to 9 carbon atoms, q signifies 0 or 1,
and r signifies 1 or 2

B signifies hydrogen, and D signifies —OH or —O1/2Ni, or B and D, together, form a single bond, with the provisos (a) that either $R_5$ signifies a radical of formula $-(CH_2)_q-S-R_8$ or a radical of formula $-S-(CH_2)_r-COOR_9$, one of $R_4$, $R_6$ and $R_7$ signifies hydrogen or methyl, and the remaining 2 significances signify hydrogen, or $R_7$ signifies a radical of formula $-(CH_2)_q-S-R_8$ or a radical of formula $-S-(CH_2)_r-COOR_9$, one of $R_4$, $R_5$ and $R_6$ signifies hydrogen or methyl, and the remaining 2 significances signify hydrogen, and (b) that $R_9$ cannot signify hydrogen when D signifies —OH or —O1/2Ni.

A particularly noteworthy class of compounds of the above formula is constituted by those compounds in which $R_1$ signifies a tertiary alkyl radical of 4 to 6 carbon atoms, $R_2'$ is an alkyl, cycloalkyl, cycloalkylalkyl or phenylalkyl radical of up to 9 carbon atoms, $R_3''$ signifies hydrogen, an alkyl, cycloalkyl or cycloalkylalkyl radical of up to 9 carbon atoms, chlorine, bromine, a 3,5-di- tert.- butyl-4-hydroxyphenyl radical, or a radical of formula —COOM', wherein M' is defined above, $R_4$ and $R_6$ are as defined above, $R_5$ and $R_7$ are as defined above, wherein $R_8$ signifies an alkyl radical of 1 to 18 carbon atoms, a phenylalkyl radical of up to 12 carbon atoms, the phenyl nucleus of the phenylalkyl radical being unsubstituted or substituted by halogen or an alkyl radical of 1 to 9 carbon atoms, or a phenyl radical, unsubstituted or substituted by halogen or an alkyl radical of 1 to 9 carbon atoms, $R_9$ signifies hydrogen or an alkyl radical of 1 to 12 carbon atoms, q signifies 0 or 1 and r signifies 2, and B and D are as defined above.

The compounds of formula I are useful as stabilizing agents in the stabilization of sensitive organic material against degradation under the influence of light, oxygen and heat. For this purpose they are incorporated in materials which are sensitive to, and may be degraded by light, oxygen and heat, or applied to these materials to form a protective surface film. They have a wide area of application in plastics technology, being useful, for example, as stabilizers for the following materials: cellulose acetate, cellulose acetobutyrate, polyethylene, polypropylene, polycarbonates, polyurethanes, polyvinyl chloride acetate, polyamides, polystyrene, ethyl cellulose, cellulose nitrate, polyvinyl alcohol, silicon rubber, cellulose propionate, melamine-formaldehyde resins, urea-formaldehyde resins, allyl casting resins, polymethyl methacrylate, polyester, polyacrylonitrile, and corresponding copolymers. The disclosed compounds are also useful for the stabilization of natural products such as rubber and cellulose. The materials for stabilization may be in the form of film or sheet, tapes, rod, panels, coatings, fibres, granules, powders or other solid forms, or in the form of solutions, emulsions or dispersions. The compounds are incorporated in or coated on the materials by standard methods. An important method of application consists in intimately mixing the stabilizing compound with a plastics material, for instance polypropylene granules, in a kneader or other suitable machine, followed by extrusion moulding. With this method homogeneous distribution is obtained, which is important for good protection. The material may be extruded, for example, in the form of film, tubing or as filament. The latter may be converted into textiles. In this method of application the stabilizer is incorporated in the polypropylene prior to textile production.

Synthetic polymeric materials need not necessarily be in the final form when the new compounds are incorporated for stabilization. The compounds can be mixed with the monomers or prepolymers prior to the condensation or other polymerization reaction giving the final polymer.

Besides being suitable for the stabilization of clear films, plastics and the like, the new compounds are applicable in opaque, semi-opaque and translucent materials with a surface susceptible to degradation by ultra-violet radiation, air or heat. Examples of such materials are foam plastics, opaque films and coatings, opaque papers, opaque and transparent pigmented plastics, fluorescent pigments, automobile and furniture polishes creams, lotions and related products, which may be either opaque, clear or translucent.

The structure of the compound of formula I is desirably formulated in relation to the organic material to be stabilized so as to obtain particularly high stabilizing action in specific organic materials. As an example of the relation between the constitution of compounds of formula I and their action, it may be mentioned that extremely good stabilization is often evident in polyalkylenes, notably polypropylene, when the molecule consists predominatnly of saturated aliphatic groups. The protective action of the new compounds against visible light and ultra-violet radiation is often particular good when nickel salts of carboxylic acids of formula I are employed. For the stabilization of polyamides against light and ultra-violet radiation the manganese and copper salts are usually particularly suitable. Compounds of the general formula I having the oxamide structure also often provide good protection against light, and these oxamides may be either symmetrical or asymmetrical. If the compounds of formula I lack the oxamide structure and the heavy metal carboxylate groups, the protective action against light is not very pronounced and in some cases may be altogether absent. However, compounds of this type are usually effective stabilizers against degradation by atmospheric oxygen or heat; this protective action appears to be due to the sterically hindered phenolic hydroxyl group. The stabilizing action of sterically hindered hydroxyl groups is generally known, one example being 2,6-di-tert.butyl-p-cresol, which is widely used as an antioxidant. This and similar compounds, however, have the disadvantage of relatively high volatility, which means that they sublime from polymeric materials when incorporated at high temperatures and from organic materials generally during extended storage periods or in final use.

When the methyl group in 2,6-di-tert.butyl-p-cresol is replaced by the phenyl group, the volatility is greatly reduced but it is still too high, and moreover the effectiveness of the compound as an antioxidant is lessened. Further enlargement of the molecule naturally results in a yet greater reduction in volatility. But it has been found that enlargement of the molecule cannot be effected in any desired manner, if good stabilizers are to be obtained. The newly introduced constituents of the molecule must impart specific properties to the final product, such as good compatibility with the organic materials for protection and high self-stability of the effective substance.

The present invention relates further to the materials which contain compounds of formula I for the purpose of stabilization. As mentioned above, the compounds of formula I can be incorporated in organic materials at any stage of processing using normal methods. The amounts used may vary within wide limits, for example from 0.01 to 5%, or preferably 0.05 to 1%, in relation to the weight of the organic material for protection.

The stabilized organic materials may contain compounds of formula I only, or these compounds together with other additives to improve the properties of the material, for example ultra-violet absorbers and stabilizers against degradation by heat and oxygen. Of the latter, stabilizers belonging to other chemical classes than the compounds of formula I are of major interest, for example organic sulphur, phosphorus and tin compounds, 2-hydroxybenzophenones and hydroxybenzotriazoles. Such stabilizer mixtures may often provide extremely good stabilization owing to a synthetic effect.

In the following Examples the parts and percentages are by weight and the temperatures in degrees centrigrade. The abbreviation M.P. stands for melting point. The chemical constitution of the compounds shown in the Examples has been verified by microanalysis and in part by spectrum analysis.

EXAMPLES OF THE PRODUCTION OF FINAL PRODUCTS OF FORMULA I

EXAMPLE 1

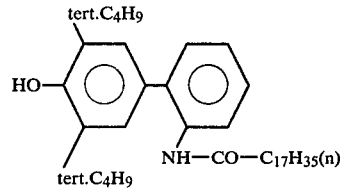

In the absence of moisture 29.7 parts of 3,5-di-tert.butyl-4-hydroxy-2'-aminobiphenyl are dissolved in 8.4 parts of pyridine and 40 parts of toluene under a nitrogen atmosphere. A mixture of 31.8 parts of stearic chloride and 60 parts of toluene is slowly added. The solution is reacted for 1 hour with reflux. After cooling the solution is shaken with water. The toluene is extracted from the organic phase by vacuum distillation. After recrystallization of the distillation residue from ethanol, 54.2 parts of the new compound are obtained in the form of colourless crystals with a melting point of 73°–74°.

EXAMPLE 2

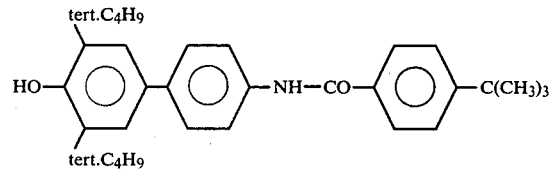

9 Parts of 3,5-di-tert.butyl-4-hydroxy-4'-aminobiphenyl are dissolved in 100 parts of toluene. With stirring, 3.1 parts of triethylamine and 6.1 parts of 4-tert.butyl benzoyl chloride are added simultaneously to the solution at 5°–10°. The solution is allowed to react for 6 hours at 20°–30° and the precipitated salt filtered off.

The toluene is removed from the filtrate by distillation under vacuum, after which the residue is recrystallized from an acetonewater mixture. The pure compound is obtained in the form of colourless crystals with a melting point of 225°–226°.

EXAMPLE 3

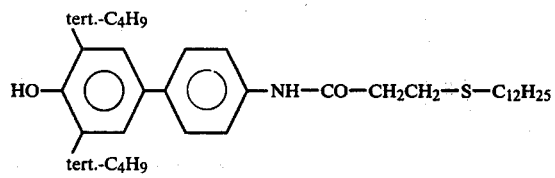

29.7 Parts of 3,5-di-tert.butyl-4-hydroxy-4'-aminobiphenyl are dissolved with stirring in 40 parts of toluene and 8.4 parts of pyridine. As described in Example 1, the solution is reacted with a solution of 41 parts of n-dodecylthiopropionic chloride in 60 parts of toluene. After recrystallization from hexane the new compound is obtained in the form of colourless crystals with a melting point of 65°–66°.

EXAMPLE 4

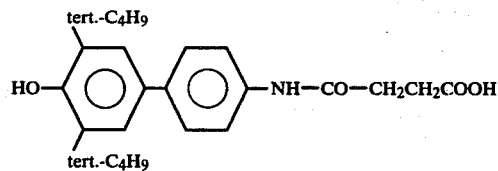

In the absence of moisture 5 parts of succinic anhydride are stirred into 120 parts of benzene at 70°, followed by a solution of 14.8 parts of 3,5-ditert.butyl-4-hydroxy-4'-aminobiphenyl in 24 parts of benzene. Within a short time the reaction product begins to settle out in the form of needle-shaped crystals, and after 1 to 2 hours at 70° the end-point of the reaction is reached. After slow cooling to 10° to 15° the product is filtered off and washed with benzene-petroleum ether 1:1. The pure compound is obtained in the form of colourless needles with a melting point of 191°–193°.

EXAMPLE 5

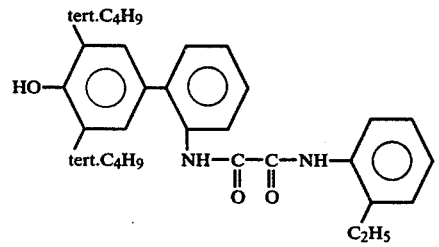

A solution of 22.3 parts of oxalic monoethylester-(2-ethyl)-anilide, 30.2 parts of 3.5-di-tert.butyl-4-hydroxy-2'-aminodiphenyl and 1.1 parts of boric acid is reacted for 3 hours at 150° with stirring. The alcohol formed is removed by vacuum distillation. About 30 parts of glacial acetic acid are run into the warm reaction mixture with continued stirring at 100° until the reaction product is completely dissolved, then the product is precipitated from solution again by vigorous centrifuging with the addition of 16 parts of water. The crystalline slurry is stirred further until completely homogeneous, filtered with suction, and the filtercake washed with water until it loses the odour of glacial acetic acid and the filtrate is colourless. For purification it is mixed with alcohol, filtered with suction and dried in a vacuum drying oven. A colourless crystalline product, m.p. 174°–176°, is obtained.

EXAMPLE 6

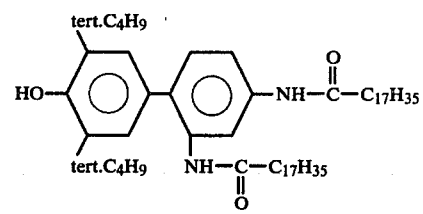

In the absence of moisture 15.6 parts of 3,5-tert.butyl-4-hydroxy-2',4'-diaminodiphenyl are dissolved in 150 parts of toluene at 10° with stirring. At the same time 11 parts of triethylamine and 31.8 parts of stearic chloride are slowly added. The solution is allowed to react at 40° until the end-point is reached after 5 hours. The precipitated salt is filtered off, the filtrate concentrated by evaporation under vacuum and the residue crystallized twice from acetone. The new compound is obtained in the form of grey crystals with a melting point of 121°–123°.

The compounds shown in the following Tables 1 to 7 may be produced in analogous manner to the procedures of Examples 1 to 6.

Table 1

$$\left[ \begin{array}{c} (H_3C)_3C \\ HO-\bigcirc-\bigcirc-NH-CO- \\ (H_3C)_3C \end{array} \right]_p Y$$

| No. | Y | p | M.P. |
|---|---|---|---|
| 1 (Example I) | $C_{17}H_{35}$ (n) | 1 | 73°–74° |
| 2 | $C_9H_{19}$(n) | 1 | 106°–108° |
| 3 | $C_{11}H_{23}$(n) | 1 | 73°–75° |
| 4 | $CH_3$ | 1 | 216°–218° |
| 5 | -⟨◯⟩-C(CH_3)_3 | 1 | 179°–180° |
| 6 | cyclohexyl-CH_2-CH(COOH)- | 1 | 210°–212° |
| 7 | -⟨◯⟩-COOH | 1 | 180°–181° |
| 8 | $-CH_2CH_2-S-C_{12}H_{25}$(n) | 1 | 80°–81° |
| 9 | $-(CH_2)_4-$ | 2 | 213°–215° |
| 10 | $-CH_2CH_2-S-CH_2CH_2-$ | 2 | 220°–221° |

Table 2

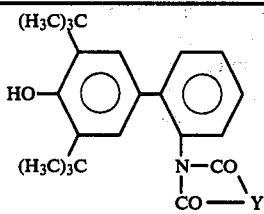

| No. | Y | M.P. |
|---|---|---|
| 11 | (cyclohexenyl, $CH_2$/$CH$ ring) | 185°–186° |
| 12 | (phenyl) | 211°–212° |

Table 3

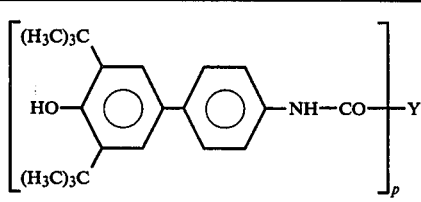

| No. | Y | p | M.P. |
|---|---|---|---|
| 13 | $-CH_3$ | 1 | 179°–181° |
| 14 | $-C_9H_{19}$ | 1 | 108°–110° |
| 15 | $-C_{11}H_{23}$ | 1 | 110°–112° |
| 16 | $-C_{17}H_{35}$ | 1 | 95°–96° |
| 17 | (p-tert-butylphenyl) | 1 | 225°–226° |
| Example 2 | | | |
| 18 | $-CH_2CH_2-COO-CH_3$ | 1 | 137°–139° |
| 19 | $-CH_2-Cl$ | 1 | 156°–158° |
| 20 | $-CH_2CH_2-Cl$ | 1 | 169°–171° |
| 21 | $-CH_2CH_2-S-C_{12}H_{25}$ | 1 | 65°–66° |
| Example 3 | | | |
| 22 | $-CH_2CH_2-COOH$ | 1 | 191°–193° |
| Example 4 | | | |
| 23 | $-CH_2CH_2-COO\frac{Ni}{2}$ | 1 | 260°–285° |
| 24 | $-CH_2CH_2-COO\frac{Zn}{2}$ | 1 | 183°–230° |
| 25 | $-(CH_2)_4-$ | 2 | 242°–244° |
| 26 | $-CH_2CH_2-S-CH_2CH_2-$ | 2 | 187° |
| 27 | $+CH_2CH_2-COO-CH_2+_4C$ | 4 | 256°–258° |
| 28 | $-CH=CH-CH=CH-CH_3$ | 1 | 194°–196° |
| 29 | $+CH_2+_{12}-CH_3$ | 1 | 81°–83° |
| 30 | $+CH_2+_{20}-CH_3$ | 1 | 89°–91° |
| 31 | $-C(CH_3)_3$ | 1 | 210°–211° |
| 32 | $-(CH_2)_3COOH$ | 1 | 217°–219° |
| 33 | $-CH=CH-COOH$ | 1 | 224°–225° |
| 34 | (phenyl) | 1 | 233°–234° |
| 35 | (biphenyl) | 1 | 265°–266° |

Table 3-continued

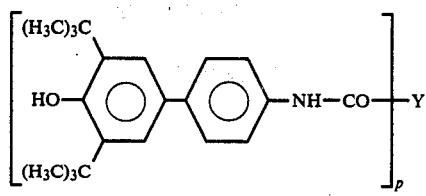

| No. | Y | p | M.P. |
|---|---|---|---|
| 36 | (o-methoxyphenyl) | 1 | 191°–192° |
| 37 | (m-methoxyphenyl) | 1 | 127°–128° |
| 38 | $-(CH_2)_8$ | 2 | 228°–229° |
| 39 | $CH_2-CH_2-C(CH_3)(C_6H_4OH(p))_2$ | 1 | 273°–275° |

Table 4

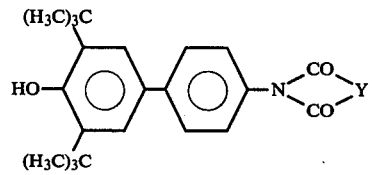

| No. | Y | M.P. |
|---|---|---|
| 40 | (cyclohexenyl ring) | 192°–193° |
| 41 | (phenyl) | 244°–246° |
| 42 | (phenyl-COOH) | 281°–283° |
| 43 | $-CH_2-CH_2-$ | 257°–259° |
| 44 | (phenyl-C(O)-O-$C_8H_{17}$(i)) | 175°–178° |

Table 5

Structure: 4-HO-3,5-di-tert-butylphenyl—(phenyl with R3' and NH—CO—CONH—Y)

| No. | Y | R3' | M.P. |
|---|---|---|---|
| 45 | (phenyl-2-C$_2$H$_5$) | H | 174°–176° |
| 46 | (phenyl-2-OC$_{16}$H$_{33}$(n)) | H | 82°–88° |
| 47 | (phenyl-3,5-di-C(CH$_3$)$_3$-4-OH) | H | 285°–289° |
| 48 | —CH$_3$ | —COOH | |
| 49 | —C$_{17}$H$_{35}$ | —Cl | |

Table 6

Structure: 4-HO-3,5-di-tert-butylphenyl—C$_6$H$_4$—NH—CO—CO—NH—Y

| No. | Y | M.P. |
|---|---|---|
| 50 | —C$_{12}$H$_{25}$(n) | 164°–166° |
| 51 | —C$_{18}$H$_{37}$(n) | 130°–132° |
| 52 | (phenyl-2-C$_2$H$_5$) | 236°–240° |
| 53 | (phenyl-3-OH) | 251°–253° |
| 54 | (phenyl-3-OC$_2$H$_5$) | 183°–185° |
| 55 | (phenyl-3-OC$_{16}$H$_{33}$) | 121°–122° |

Table 6-continued

| No. | Y | M.P. |
|---|---|---|
| 56 | (phenyl-3,5-di-CH$_3$) | 234°–235° |
| 57 | (phenyl-3-OCOCH$_2$—S—C$_{12}$H$_{25}$) | 96°–99° |
| 58 | (phenyl-3-OCOC$_2$H$_4$—S—C$_{12}$H$_{25}$) | 117°–121° |
| 59 | (phenyl-3-S—CH$_3$) | 188°–190° |
| 60 | (phenyl-4-OCOCH$_2$—S—C$_{12}$H$_{25}$) | 114°–116° |
| 61 | (phenyl-4-OCOC$_2$H$_4$—S—C$_{12}$H$_{25}$) | 135°–140° |
| 62 | (phenyl-4-OCOCH$_2$—S—C$_{12}$H$_{25}$) | 171°–173° |
| 63 | (phenyl-4-OCOC$_2$H$_4$—S—C$_{12}$H$_{25}$) | 165°–167° |

Table 7

Structure: 4-HO-3,5-di-tert-butylphenyl—(phenyl with NH—CO—Y and NH—CO—Y)

| No. | Y | M.P. |
|---|---|---|
| 64 | —C$_9$H$_{19}$ | 167°–168° |
| 65 | —C$_{17}$H$_{35}$ | 121°–123° |
| Example 6 66 | (phenyl-4-C(CH$_3$)$_3$) | 256°–258° |

Table 7-continued
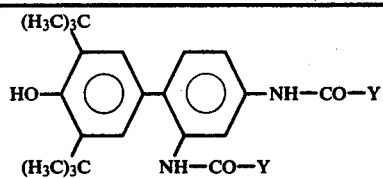
| No. | Y | M.P. |
|---|---|---|
| 67 | —CH₂—S—C₁₂H₂₅ | 54°–58° |
The following compounds can be produced in an analogous manner to the above Examples:
No. 68 — M.P. 81°–82°
No. 69 — M.P. 325°
No. 70 — M.P. 268°–270°
No. 71 — M.P. 250°–252°
No. 72 — M.P. 124°–126°
No. 73 — M.P. 193°–198°
No. 74 — M.P. 100°–102°

| | | |
|---|---|---|
| No. 75 | (structure: 3,5-di-tert-butyl-4-hydroxyphenyl-phenyl-NH-CO-CO-NH-phenyl-3,5-di-tert-butyl-4-hydroxyphenyl) | M.P. 307°–310° |
| No. 76 | (structure: 3,5-di-tert-butyl-4-hydroxyphenyl-phenyl-NH-CO-CO-OC$_2$H$_5$) | M.P. 205°–207° |
| No. 77 | (structure: 3,5-di-tert-butyl-4-hydroxyphenyl-phenyl-NH-CO-CO-NH-phenyl-OH (para)) | M.P. >300° |
| No. 78 | (structure: 3,5-di-tert-butyl-4-hydroxyphenyl-phenyl-NH-CO-CO-NH-phenyl-OH (meta)) | M.P. 295°–297° |
| No. 79 | (structure: 3,5-di-tert-butyl-4-hydroxyphenyl-phenyl-NH-CO-CO-NH-phenyl-OH (ortho)) | M.P. 254°–257° |
| No. 80 | (structure: 3,5-di-tert-butyl-4-hydroxyphenyl-phenyl-NH-CO-CO-NH-phenyl-C$_{12}$H$_{25}$) | M.P. 85°–89° |
| No. 81 | (structure: 3,5-di-tert-butyl-4-hydroxyphenyl-phenyl-NH-CO-CO-NH-phenyl-O-phenyl) | M.P. 238°–240° |
| No. 82 | (structure: 3,5-di-tert-butyl-4-hydroxyphenyl-phenyl-N-(phthalimide with COO-C$_{12}$H$_{25}$ substituent)) | M.P. 90°–93° |
| No. 83 | (structure: 3,5-di-tert-butyl-4-hydroxyphenyl-phenyl-N-(tetrachlorophthalimide)) | M.P. 277°–278° |
| No. 84 | (structure: 3,5-di-tert-butyl-4-hydroxyphenyl-phenyl-N-(hexahydrophthalimide)) | M.P. 200°–202° |

-continued

No. 85 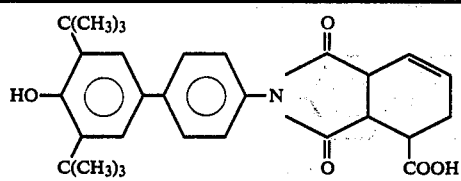 M.P. 206°–207°

No. 86 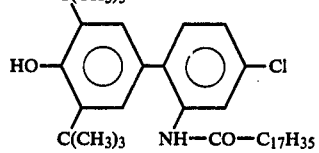 M.P. 91°–92°

No. 87 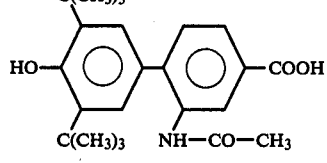 M.P. 195°–198°

EXAMPLE 7

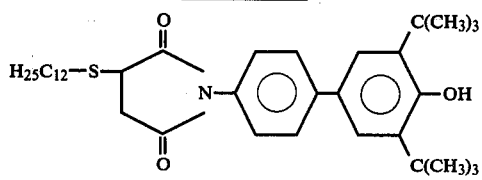

5.9 Parts of 3,5-di-tert.-butyl-4-hydroxy-4'-aminobiphenyl and 6.0 parts of dodecylthio-succinic anhydride are heated together in a mixture of saturated hydrocarbons (b.p. 160°–170°) for 2 hours. The solvent is then distilled off in vacuo, and the product recrystallised from petroleum ether, to yield white crystals, M.P. 90°–92°, of the formula given above.

| Analysis | C | H | N | S |
|---|---|---|---|---|
| Found | 74.5 | 8.9 | 2.4 | 5.4 |
| Calculated | 74.6 | 9.2 | 2.4 | 5.5 |

EXAMPLE 8

6.3 Parts of dodecylthiomethyl-succinic anhydride and 5.9 parts of 3,5-di-tert.-butyl-4-hydroxy-4'-aminobiphenyl in 30 parts of benzene are allowed to stand for 2 hours at room temperature. The solvent is then distilled off and the residue recrystallised from petroleum ether.

The main product, M.P. 130°–133°, has the formula,

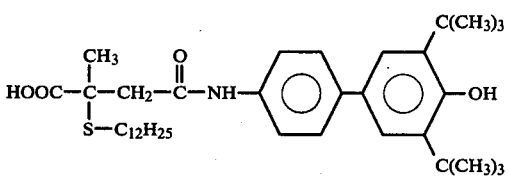

and, as a by-product, the compound of formula,

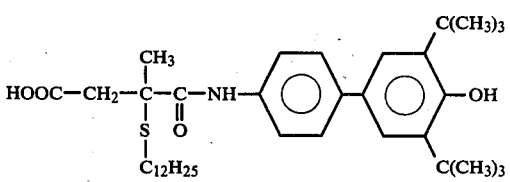

is obtained.

To produce the nickel salts of such compounds 5 parts of the acid compound are dissolved in 15 parts of methanol, and to the solution is added the stoichiometric amount of nickel acetate. The nickel salt product precipitates out spontaneously.

The compounds in the following tables 8, 9, 10 and 11 are produced in an analogous manner.

Table 8
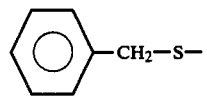
| No. | R₅' | R₄' | M.P. (°C.) | | C | H | N | S |
|---|---|---|---|---|---|---|---|---|
| 88 | H₉C₄—S— | H | 164–166 | found | 71.5 | 7.9 | 3.2 | |
|    |         |   |         | Calc. | 71.9 | 8.0 | 3.0 | |
| 89 | 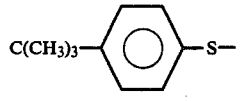 | H | 170–171 | | 73.0 | 6.6 | 2.9 | 6.9 |
|    |         |   |         | | 74.2 | 7.0 | 2.8 | 6.4 |
| 90 | 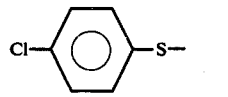 | H | 205–206 | | 74.7 | 7.7 | 2.8 | |
|    |         |   |         | | 75.1 | 7.6 | 2.6 | |
| 91 | 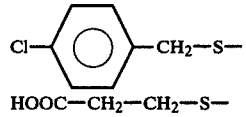 | H | 204–206 | | 69.9 | 6.3 | 2.7 | 6.1 |
|    |         |   |         | | 68.9 | 6.2 | 2.7 | 6.1 |
| 92 |  | H | 173–176 | | 66.8 | 6.6 | 2.6 | |
|    |         |   |         | | 67.2 | 6.5 | 2.5 | |
| 93 | HOOC—CH₂—CH₂—S— | H | 160 dec. | | 67.4 | 7.0 | 2.8 | 6.3 |
|    |         |   |         | | 67.1 | 6.9 | 2.9 | 6.6 |
| 94 | i-C₈H₁₇OOCCH₂—CH₂—S— | H | resin | | | | 2.6 | 5.9 |
|    |         |   |         | | | | 2.6 | 5.4 |
| 95 | H₉C₄—S— | CH₃— | 128–132 | | 72.3 | 8.2 | 2.9 | |
|    |         |   |         | | 72.4 | 8.1 | 3.3 | |
| 96 | H₂₅C₁₂—S— | CH₃— | 84–86 | | 74.7 | 9.4 | 2.3 | |
|    |         |   |         | | 74.8 | 9.3 | 2.4 | |
| 97 | 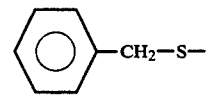 | CH₃ | 223–224 | | 67.7 | 6.8 | 2.7 | 5.5 |
|    |         |   |         | | 68.7 | 6.5 | 2.7 | 6.1 |
Table 9
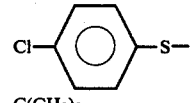
| No. | R'₇ | R'₆ | M.P. (°C.) | C | H | N | S | |
|---|---|---|---|---|---|---|---|---|
| 98 | H₉C₄—S— | H | 179–182 | 69.3 | 7.9 | 2.9 | | found |
|    |         |   |         | 69.2 | 8.1 | 2.9 | | calc. |
| 99 | 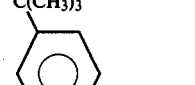 | H | 151–152 | 71.4 | 7.3 | 2.7 | 6.5 | |
|    |         |   |         | 71.6 | 7.2 | 2.7 | 6.2 | |
| 100 | (Cl-phenyl-S—) | H | 193–195 | 66.8 | 6.3 | 2.6 | 5.7 | |
|     |         |   |         | 66.7 | 6.3 | 2.5 | 5.9 | |
| 101 | C(CH₃)₃-phenyl-S— | H | 157–160 | 72.7 | 7.7 | 2.5 | | |
|     |         |   |         | 72.4 | 7.9 | 2.4 | | |

Table 9-continued $$R'_7-\underset{\underset{COOH}{|}}{\overset{\overset{R'_6}{|}}{C}}-CH_2-\overset{O}{\overset{\|}{C}}-NH-\bigcirc\!\!\!\!\bigcirc-\bigcirc\!\!\!\!\bigcirc(C(CH_3)_3)(OH)(C(CH_3)_3)$$

| No. | R'$_7$ | R'$_6$ | M.P. (°C.) | Analysis % | | | |
|---|---|---|---|---|---|---|---|
| | | | | C | H | N | S |
| 102 | Cl-C$_6$H$_4$-CH$_2$-S- | H | 173–176 | 66.8 | 6.6 | 2.6 | |
| | | | | 67.2 | 6.5 | 2.5 | |
| 103 | Cl-C$_6$H$_4$-S- | CH$_3$ | 215–216 | 68.0 | 6.7 | 2.5 | 5.4 |
| | | | | 67.3 | 6.5 | 2.5 | 5.8 |

Table 10

| No. | R$_{10}$ | M.P. (°C.) | Analysis % | | | |
|---|---|---|---|---|---|---|
| | | | | C | H | N | S |
| 104 | Cl-C$_6$H$_4$-S-CH(succinimide) | resinous | found | 69.8 | 6.5 | 2.2 | 5.3 |
| | | | calc. | 68.9 | 6.2 | 2.7 | 6.1 |
| 105 | Cl-C$_6$H$_4$-CH$_2$-S-CH(CH$_2$COOH)-C(O)-NH- | resinous | | 70.9 | 6.9 | 2.4 | 6.5 |
| | | | | 71.6 | 7.2 | 2.7 | 6.2 |

Table 11

$$Ni\left[-O-\overset{O}{\overset{\|}{C}}-\underset{\underset{R_7'}{|}}{\overset{\overset{R_6'}{|}}{C}}-CH_2-\overset{O}{\overset{\|}{C}}-NH-\bigcirc\!\!\!\!\bigcirc-\bigcirc\!\!\!\!\bigcirc(C(CH_3)_3)(OH)(C(CH_3)_3)\right]_2$$

| No. | R$_7'$ | R$_6'$ | M.P. (°C.) | Analysis % Ni | |
|---|---|---|---|---|---|
| 106 | H$_{25}$C$_{12}$—S— | H | 178–181 | found | 5.2 |
| | | | | calc. | 4.7 |
| 107 | Cl-C$_6$H$_4$-S- | H | 206–207 | | 5.5 |
| | | | | | 5.3 |
| 108 | Cl-C$_6$H$_4$-S-CH$_2$- | H | 234–237 | | 5.4 |
| | | | | | 5.0 |

Table 11-continued

| No. | $R_7'$ | $R_6'$ | M.P. (°C.) | Analysis % Ni |
|-----|--------|--------|-----------|---------------|
| 109 | 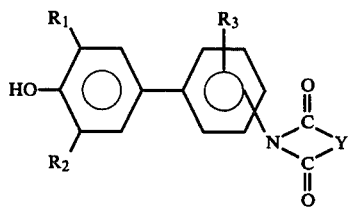 | $CH_3$ | 186–188 | 5.2<br>5.0 |

EXAMPLES OF THE APPLICATION OF COMPOUNDS OF FORMULA I

EXAMPLE A

Polypropylene powder is homogeneously mixed with 0.4% of compound No. 16 in Table 4, the mixture kneaded for 5 minutes on a roller mill at 180° and extrusion moulded as sheet of 1 mm thickness.

Discs of 18 mm diameter are punched out of the sheet and placed, after expulsion of the air, in a closed system under an oxygen atmosphere. The temperature is increased to 190° creating an excess pressure of about 20 mm/Hg. The resulting oxidation of the polymer leads to a decrease in pressure. If the effectiveness of the stabilizer is high, the rate of decrease is small. The time taken for the pressure to fall to zero is recorded to assess the resistance to oxidative degradation. Good resistance was observed.

EXAMPLE B

Polypropylene powder and 0.4% of the stabilizer under test are homogeneously mixed, the mixture kneaded on a roller mill for 5 minutes at 180° and extruded as 1 mm thick sheet. The resistance to ageing of the sheet is assessed by an accelerated test method in an oven at 140° with air circulation. Good resistance to ageing using various of the compounds of formula I, in comparison with a control, was observed.

What is claimed is:

1. A compound of the formula

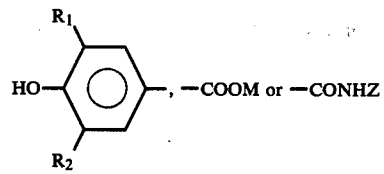

in which $R_1$ is a tertiary alkyl radical of 4 to 9 carbon atoms, $R_2$ is an alkyl, cycloalkyl or cycloalkylalkyl radical of up to 18 carbon atoms or an aralkyl radical of up to 18 carbon atoms, $R_3$ signifies hydrogen; an alkyl, cycloalkyl or cycloalkylalkyl radical of up to 9 carbon atoms; halogen; cyano; trifluoromethyl or a radical of formula $$\text{HO} - \underset{R_2}{\underset{|}{\overset{R_1}{\overset{|}{\bigcirc}}}} -, -COOM \text{ or } -CONHZ$$

in which $R_1$ and $R_2$ are as defined above,

M is hydrogen, nickel, zinc, manganese, copper or an alkyl radical of 1 to 9 carbon atoms, and Z is an alkyl radical of 1 to 9 carbon atoms, and each Y contains a total of up to 22 carbon atoms and is a divalent aliphatic, alicyclic, alicyclicaliphatic or araliphatic radical which is saturated or unsaturated with one or two double or triple bonds or a divalent aromatic radical, which radical has no hetero atoms or is interrupted up to two times by sulphur or oxygen atoms or by —COO— or —CONH— and is unsubstituted or substituted by halogen, OH, CN or COOM' in which M' signifies hydrogen, nickel, zinc, manganese or copper.

2. A compound according to claim 1, of formula I in which $R_1$ is a tertiary aliphatic radical of 4 to 6 carbon atoms, $R_2$ is an alkyl, cycloalkyl, cyclohexylene or cyclohexenylene or phenylalkyl radical with from 4 to 9 carbon atoms, $R_3$ is hydrogen or alkyl, cycloalkyl or cycloalkylalkyl of up to 9 carbon atoms, bromine, chlorine, cyano, trifluoromethyl, —COOM, —CONHCH$_3$ or —CONHC$_2$H$_5$ or a 3,5-di-tert.butyl-4-hydroxyphenyl radical, Y signifies an alkyl radical of up to 22 carbon atoms, which is saturated or unsaturated with one or two double or triple bonds, a cyclohexyl radical which is unsubstituted or substituted once or twice by an alkyl radical, the total number of carbon atoms in the substituent(s) being not greater than 16, a phenylene or diphenylene radical which is unsubstituted or substituted once or twice by an alkyl radical, the total number of carbon atoms in the substituent(s) being not greater than 16, each of said radicals having no hetero atoms or being interrupted up to four times by sulphur or oxygen atoms or by —COO— or —CONH— and are unsubstituted or substituted by chlorine, bromine, OH, CN or COOM'.

3. A compound according to claim 2, in which $R_1$ and $R_2$ are tertiary butyl, $R_3$ is hydrogen, Y is an aliphatic radical which is saturated or unsaturated with one or two double bonds with a total of up to 22 carbon atoms, which contain no hetero atoms or is interrupted up to four times by oxygen, sulphur or —COO—, and is unsubstituted or substituted by chlorine, OH or —COOM″ in which M″ is hydrogen or an equivalent of zinc or nickel, a cyclohexylene or cyclohexenylene radical which is unsubstituted or substituted once by —COOM″ in which M″ is as defined above, or a phenylene radical which is unsubstituted or substituted once or twice by an alkyl radical as defined above provided the total number of carbon atoms in the substituent(s) is not greater than 16, or once by phenyl or phenyl substituted by OH and adjacent tertiary butyl groups, or once by —COOH or —OH.

4. The compound of claim 1 of the formula

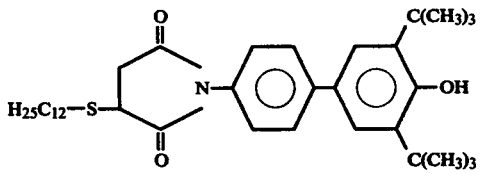

5. The compound of claim 1 of the formula

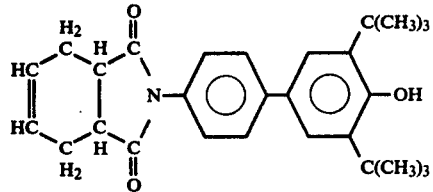

6. A compound according to claim 1 wherein $R_3$ is hydrogen; an alkyl, cycloalkyl or cycloalkylalkyl radical of up to 9 carbon atoms; halogen; cyano; or trifluoromethyl.

7. A compound according to claim 6 wherein $R_3$ is hydrogen.

8. A compound according to claim 1, 6 or 7 wherein Y has no hetero atoms or is interrupted up to a total of two times by one each of sulphur, oxygen, —COO— or —CONH—.

9. A compound according to claim 1, 6 or 7 wherein Y is alkylene, cycloalkylene, cycloalkenylene, arylene or alkoxycarbonylarylene.

10. A method of stabilizing an organic material subject to degradation by light, heat or oxygen, which compries incorporating in such material or applying as a surface coating thereto a compound according to claim 1.

11. An organic material stabilized against the degradation of light, heat or oxygen whenever treated by a method according the claim 10.

* * * * *